(12) United States Patent
Nakatsugawa

(10) Patent No.: US 6,356,568 B1
(45) Date of Patent: Mar. 12, 2002

(54) COMMUNICATION METHOD AND COMMUNICATION SYSTEM

(75) Inventor: Yoshinori Nakatsugawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/105,174

(22) Filed: Jun. 26, 1998

(30) Foreign Application Priority Data

Jun. 27, 1997 (JP) .............................................. 9-172469

(51) Int. Cl.⁷ ................................................. H04J 3/12
(52) U.S. Cl. ....................... 370/522; 370/341; 370/437; 370/444; 370/455; 370/462
(58) Field of Search ................................. 370/313, 314, 370/315, 321, 341, 401, 402, 431, 437, 444, 447, 455, 461, 462, 522, 274, 279, 293

(56) References Cited

U.S. PATENT DOCUMENTS

| | | | | |
|---|---|---|---|---|
| 4,636,791 A | * | 1/1987 | Burke et al. ................. 370/313 |
| 4,831,373 A | * | 5/1989 | Hess ........................... 370/341 |
| 5,014,314 A | * | 5/1991 | Mulford et al. ............. 370/314 |
| 5,918,171 A | * | 6/1999 | Funke et al. ................ 455/403 |

FOREIGN PATENT DOCUMENTS

| | | |
|---|---|---|
| JP | 63-263852 | 10/1988 |
| JP | 4-344742 | 12/1992 |
| JP | 8-149148 | 6/1996 |

* cited by examiner

*Primary Examiner*—Douglas Olms
*Assistant Examiner*—Shick Hom
(74) *Attorney, Agent, or Firm*—Oblon, Spivak, McClelland, Maier & Neustadt, P.C.

(57) ABSTRACT

When each of a plurality of repeaters receives emergency data including an emergency command informing the occurrence of an emergency from a node terminal connected to own repeater or the like, it temporarily suspends the processing of inputting and outputting communication data which is not emergency data for itself, preferentially permits the processing of inputting and outputting emergency data and transmits the received emergency data to at least one destination terminal.

6 Claims, 6 Drawing Sheets

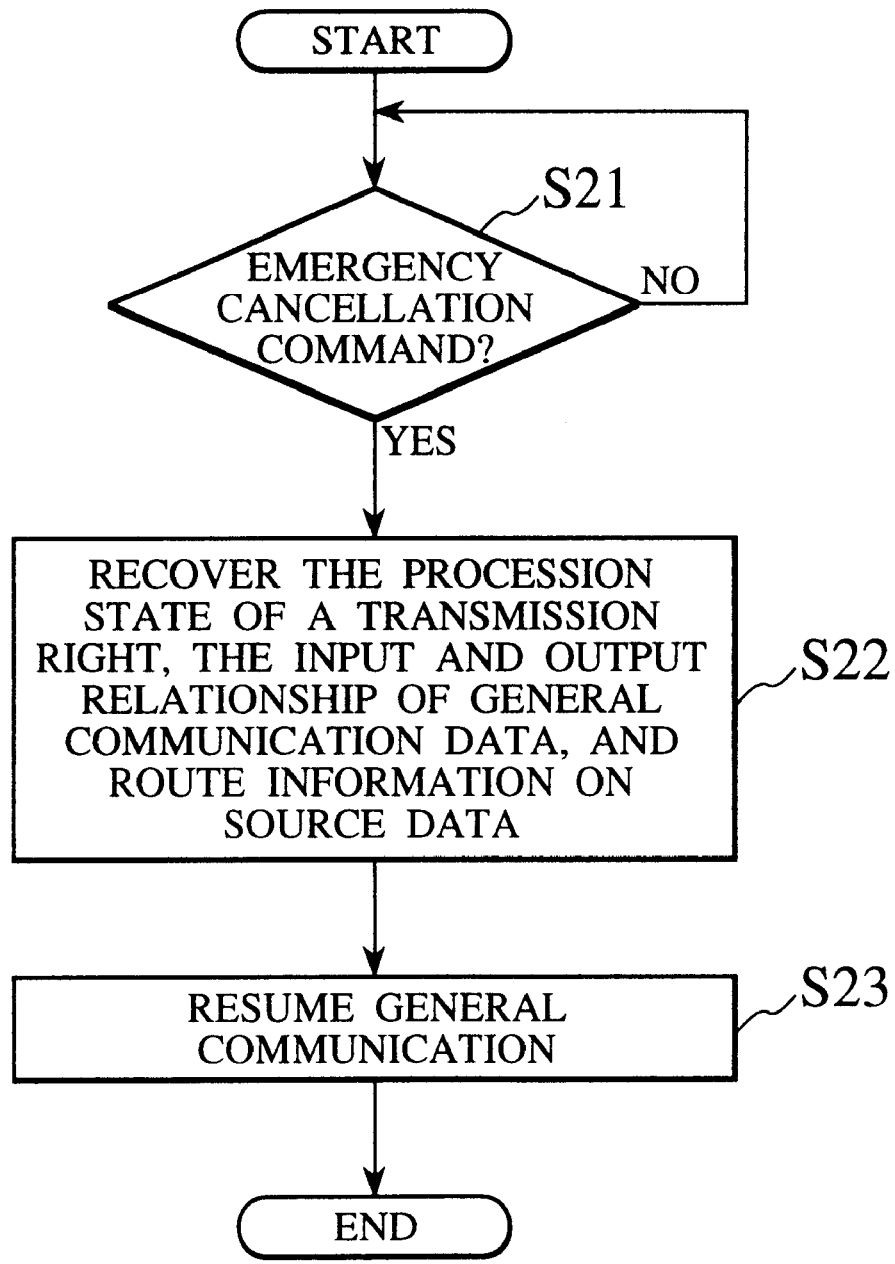

COMMUNICATION METHOD AND COMMUNICATION SYSTEM

BACKGROUND OF THE INVENTION

1. Field of the Invention

The present invention relates to a communication system, constructed by interconnecting a plurality of repeaters, each connected to at least one node terminal, by a data transmission line, for exchanging data between node terminals, between repeaters or between a node terminal and a repeater. Particularly, it relates to a communication method which can satisfy a request for transmitting emergency data immediately without executing a redundant processing procedure and without producing a transmission wait time when a node terminal connected to a certain repeater makes the request to transmit emergency data including an emergency command informing the occurrence of an emergency to at least one node terminal connected to another repeater quickly and to a communication system.

2. Prior Art

Heretofore, there has been generally known a communication system, constructed by interconnecting a plurality of repeaters, each connected to at least one node terminal, by a data transmission line, for exchanging data between node terminals, between repeaters or between a node terminal and a repeater.

In the above conventional communication system, when a node terminal connected to a certain repeater is to transmit communication data to at least one node terminal connected to another repeater, the node terminal having communication data to be transmitted monitors whether the data transmission line is used by another node terminal before it transmits the communication data and transmits the communication data to the above predetermined destination node terminal when the line can be used. On the other hand, when the line cannot be used, the node terminal waits until the line can be used and transmits the communication data to the predetermined destination node terminal when the line can be used.

As another prior art, when the line cannot be used as the result of monitoring the usage state of the line, the node terminal waits for a random time interval and tries to transmit communication data to the predetermined destination node terminal after the end of the wait time.

Thereby, communication data can be transmitted to the predetermined destination node terminal without fail by preventing as much as possible the destruction of the communication data caused by the collision of data which occurs when a plurality of different node terminals try to transmit communication data at the same time.

In the above conventional communication system, there is a case where a node terminal connected to a certain repeater makes a request to transmit emergency data including an emergency command informing the occurrence of an emergency to at least one node terminal connected to another repeater quickly.

In this case, the node terminal having the emergency data tries to forcedly transmit the emergency data to the predetermined destination node terminal irrespective of the result of monitoring the usage state of the line and to transmit the emergency data again after data being communicated is destroyed by this forced transmission.

However, according to an emergency handling method in the above conventional communication system, a redundant processing procedure must be executed that the transmission of emergency data is tried again after the data being communicated is destroyed by the forced transmission of emergency data, whereby it takes relatively long time to secure a usable communication line with the result that it is difficult to transmit emergency data to a destination node terminal quickly.

SUMMARY OF THE INVENTION

In view of the above situation, it is an object of the present invention to provide a communication method and a communication system which can satisfy a request for transmitting emergency data immediately without executing a redundant processing procedure and without producing a unnecessary wait time when a node terminal connected to a certain repeater yields the request to transmit emergency data including an emergency command informing the occurrence of an emergency to at least one node terminal connected to another repeater quickly.

To attain the above object of the present invention, there is provided a communication method, used in a communication system consisting of a plurality of repeaters interconnecting by a data transmission line, and each connected to at least one node terminal, exchanging data between node terminals, between repeaters, or between a node terminal and a repeater, the communication method comprising the steps of, at each of a plurality of repeaters: upon receiving the emergency data including an emergency command informing the occurrence of an emergency from a node terminal connected to own repeater, a repeater other than own repeater, or a node terminal connected to a repeater other than own repeater, temporarily suspending a processing of inputting and outputting communication data which is not emergency data for own repeater; preferentially permitting a processing of inputting and outputting emergency data for own repeater; and transmitting the received emergency data to at least one destination on the data transmission line.

According to the present invention, each of the plurality of repeaters temporarily suspends the processing of inputting and outputting communication data which is not emergency data for own repeater, preferentially permits the processing of inputting and outputting emergency data for the repeater and transmits the received emergency data to at least one destination when it receives the emergency data including an emergency command informing the occurrence of an emergency from a node terminal connected to own repeater, a repeater other than own repeater or a node terminal connected to a repeater other than own repeater. Therefore, for example, when a node terminal connected to a certain repeater yields a request to transmit emergency data including an emergency command to at least one node terminal connected to another repeater quickly, the request for transmitting the emergency data can be accomplished immediately without executing a redundant processing procedure and without producing unnecessary wait time.

In a preferred embodiment of the present invention, the emergency data further include emergency information on an emergency.

In a preferred embodiment of the present invention, upon receiving an emergency data including an emergency cancellation command informing the end of the emergency after the reception of the emergency data including the emergency command, each of the plurality of repeaters resumes the processing of inputting and outputting communication data which is not emergency data for own repeater and transmits emergency data including the emergency cancellation command to at least one destination on the data transmission line.

To attain the above object of the present invention, there is provided a communication system consisting of a plurality of repeaters interconnecting by a data transmission line, and each connected to at least one node terminal, for exchanging data between node terminals, between repeaters, or between a node terminal and a repeater, each of the plurality of repeaters comprising: receiving means for receiving communication data from a node terminal connected to own repeater, a repeater other than own repeater, and a node terminal connected to a repeater other than own repeater; emergency data prior processing means for temporarily suspending a processing of inputting and outputting communication data which is not emergency data for own repeater and preferentially permitting a processing of inputting and outputting emergency data for own repeater when communication data received by the receiving means is emergency data including an emergency command informing an occurrence of an emergency; and transmitting means for transmitting the communication data to at least one destination on the data transmission line, wherein the transmitting means transmits the emergency data received by the receiving means to at least one destination when the communication data received by the receiving means is the emergency data including the emergency command.

According to the present invention, in each of the plurality of repeaters, the receiving means receives communication data from a node terminal connected to own repeater, a repeater other than own repeater or a node terminal connected to a repeater other than own repeater. When the communication data received by the receiving means is emergency data including an emergency command informing the occurrence of an emergency, the emergency data prior processing means temporarily suspends the processing of inputting and outputting communication data which is not emergency data for own repeater and preferentially permits the processing of inputting and outputting emergency data for own repeater. The transmitting means transmits the emergency data including the emergency command to at least one destination when the communication data received by the receiving means is the emergency data including the emergency command.

Thereby, when a node terminal connected to a certain repeater yields a request to transmit emergency data including an emergency command to at least one node terminal connected to another repeater quickly, the request for transmitting emergency data can be accomplished immediately without executing a redundant processing procedure and without producing unnecessary wait time.

In a preferred embodiment of the present invention, the emergency data further include emergency information on an emergency.

In a preferred embodiment of the present invention, each of the plurality of repeaters further comprises resuming means for resuming the processing of inputting and outputting communication data which is not emergency data for own repeater, when communication data received by the receiving means is emergency data including an emergency cancellation command informing the end of the emergency after the reception of the emergency data including the emergency command, and the transmitting means transmits the emergency data including the emergency cancellation command to at least one destination when the communication data received by the receiving means is the emergency data including the emergency cancellation command.

The above and other objectives, features and advantages of the invention will become more apparent from the following description when taken in conjunction with the accompanying drawings.

BRIEF DESCRIPTION OF THE DRAWINGS

In the accompanying drawings:

FIG. 6 is a flow chart showing a processing procedure when a repeater other than an emergency repeater receives an emergency cancellation command.

DESCRIPTION OF THE PREFERRED EMBODIMENTS

Figure 1:
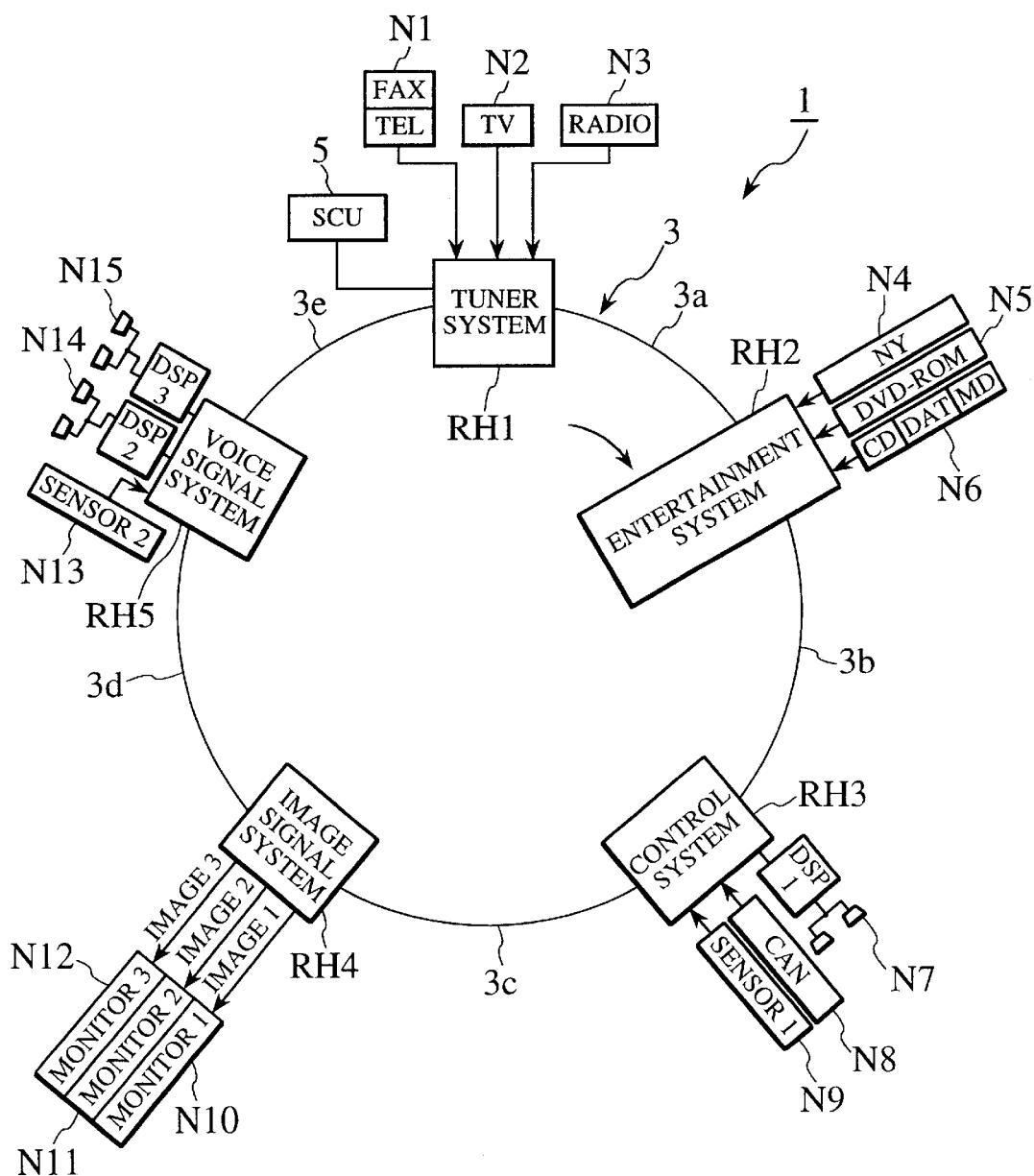
FIG. 1 is a schematic block diagram of a whole communication system according to the present invention.

A communication method and a communication system according to preferred embodiments of the present invention will be described in detail hereinunder with reference to the accompanying drawings. The communication system according to the present invention which is applied to a car network for interconnecting functional devices installed on a vehicle by a data transmission line will be described.

The communication system 1 according to the present invention is constructed by interconnecting a plurality of route hubs RH1, RH2, RH3, RH4 and RH5 as repeaters by a loop data transmission line 3 so that data can be exchange therebetween. A system control unit (SCU) 5 for generally supervising the synchronization control of the whole communication system 1, the address setting operation of each route hub RH constituting the communication system 1 and each functional device N to be described hereinafter, and the like is connected to the route hub RH1. As for the network topology of the communication system 1, an appropriate configuration such as a bus or star configuration can be employed in addition to the above-described loop configuration. As the data transmission line 3, appropriate data transmission means such as an optical fiber, coaxial cable, a twisted paired cable or the like can be used.

Functional devices N1 to N15 are connected to the plurality of route hubs RH as node terminals and at least one functional device is connected to each of the route hubs RH. Data can be exchanged between route hubs RH, between functional devices N or between a functional device N and a route hub RH over a data transmission line 3, for example, which permits the transmission of communication data in a clockwise direction as shown by an arrow in FIG. 1. A portable telephone, facsimile (FAX), digital TV, radio receiver, navigation system (NV), DVD (Digital Video Disc or Digital Versatile Disc)-ROM system, CD (Compact Disc)-ROM system, DAT (Digital Audio Tape recorder), MD (Mini Disc), audio amplifier incorporating a digital signal processor (DSP), CAN (Controller Area network) interface, sensor such as an azimuth sensor or car speed sensor, monitor device and car personal computer can be suitably used as the functional devices N when the communication system of the present invention is applied to a vehicle.

The route hubs RH are divided by function into, for example, a tuner system for receiving radio waves from a facsimile or portable telephone, broadcast waves from a digital TV or radio receiver, entertainment system for receiving voice signals, image signals, traffic jam information or the like from functional devices N such as a navigation system (NV) and the like, a control system for receiving control information and the like from functional devices N such as sensors and the like, image signal system for outputting image signals to a monitor device and the like, and a voice signal system for outputting voice signals to an audio amplifier incorporating a digital signal processor (DSP) and the like.

A specific address which can be identified mutually is assigned to each of the plurality of route hubs RH and each of the functional devices N in advance by the address setting operation of the system control unit (SCU) 5 when the communication system 1 is powered on. These addresses are used to specify a destination and transmitter or originator when data is exchanged between route hubs RH, between functional devices N and between a functional device N and a route hub RH over the data transmission line 3. In the example of FIG. 1, specific device addresses such as RH1, RH2, RH3, RH4 and RH5 are assigned to the plurality of route hubs RH, and N1, N2, N3, . . . N15 are assigned to the plurality of functional devices N.

Figure 3:
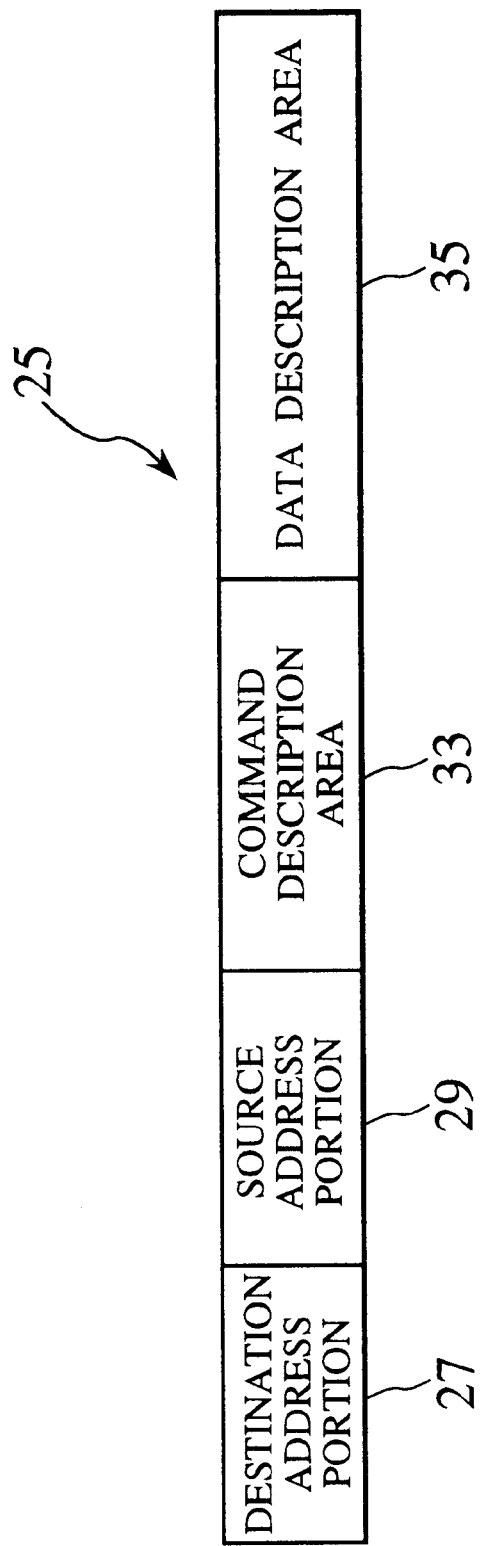
FIG. 3 is a diagram showing the frame format of communication data used in the communication system.

With reference to FIG. 3, the frame format of communication data to be transmitted within the communication system 1 will be described. There are a plurality of information description areas to which various information is written in the signal frame 25 of communication data. The plurality of information description areas include a destination address portion 27 to which the address of a destination is written, a source address portion 29 to which the address of a source is written, a command description area 33 to which commands including an emergency command and an emergency cancellation command which will be described hereinafter and operation information on the operation state of each functional device N are written, and a data description area 35 to which source data such as voice information and image information are written.

The operation information of the functional device N is, for example, an operation state of a CD-ROM system such as "reproduction" or "stop" when the functional device N is the CD-ROM system for reproducing digital audio data recorded on a compact disk and a detection state of a brake sensor whether the brake pedal of a car is stepped on or not when the functional device N is the brake sensor for detecting whether the brake pedal of a car is stepped on or not.

Figure 2:
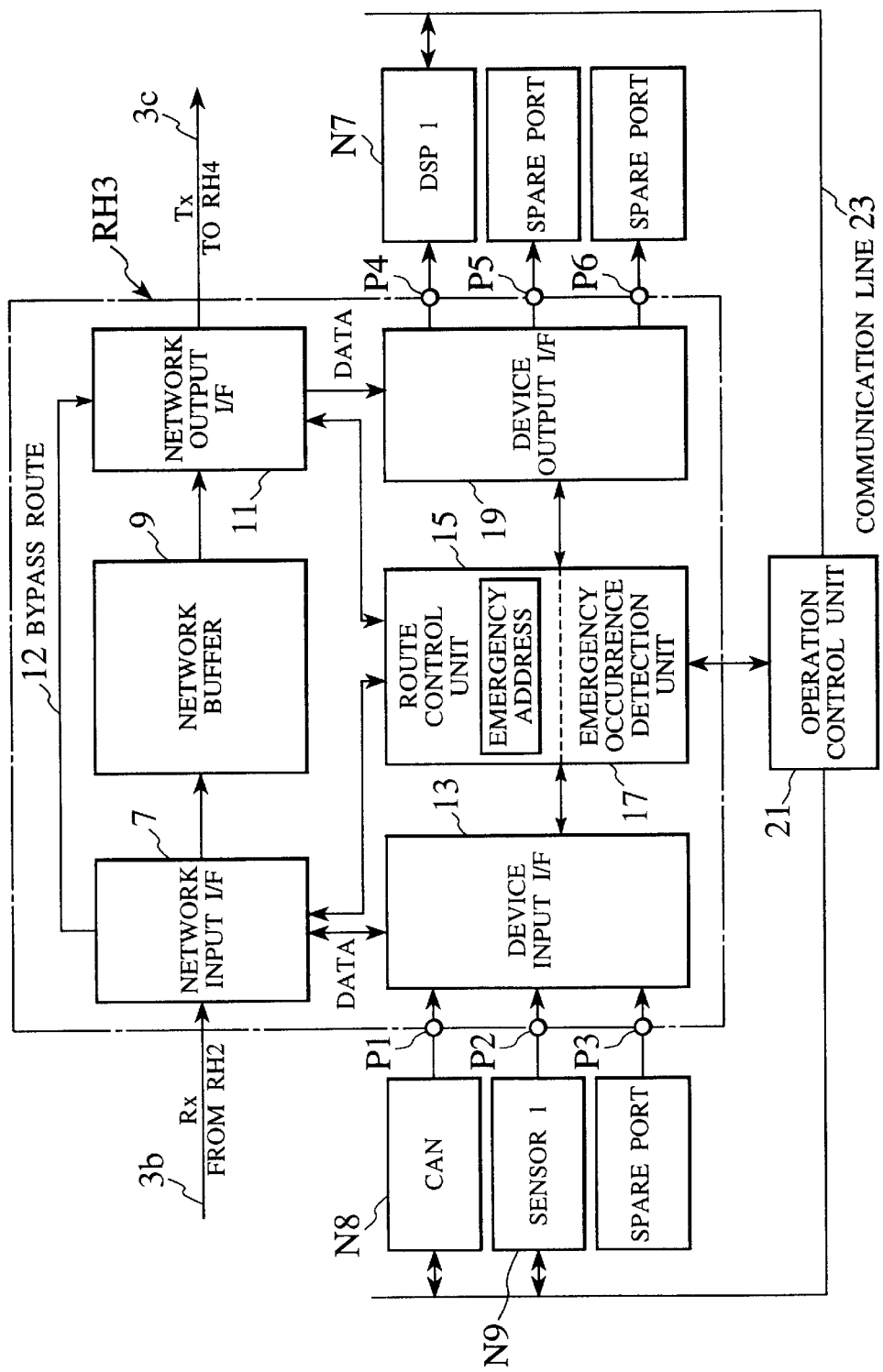
FIG. 2 is a block diagram of a repeater which is a key part of the communication system.

Thereafter, the block configuration of the inside of the route hub as a repeater will be described with reference to FIG. 2. The route hub RH3 as a typical example of the route hub comprises a network input interface (to be abbreviated as I/F hereinafter) 7, a network buffer 9, a network output I/F 11, a bypass route 12 for connecting the network input I/F 7 and the network output I/F 11 to transfer data, a device input I/F 13, a route control unit 15, an emergency occurrence detection unit 17 and a device output I/F 19.

The route hub RH3 is connected to functional devices N7, N8 and N9 for inputting and outputting source data and various command data to the route hub RH3 and an operation control unit 21, connected to the functional devices N7, N8 and N9 by a communication line 23, for always monitoring and receiving operation information on the functional devices N7, N8 and N9, transmitting the received operation information to the route control unit 15, receiving operation information on the functional devices N7, N8 and N9 from the route control unit 15, and transmitting the received operation information to the functional devices N7, N8 and N9. The operation control unit 21 may be incorporated in the route hub RH3.

The network input I/F 7 receives communication data including various commands, operation information on the functional devices N or source data from the route hub RH2 located on an upstream side over the data transmission line 3b or from the device input I/F 13 and transmits the received communication data according to a route selection signal transmitted from the route control unit 15 to the network buffer 9 or to the network output I/F 11 thorough the bypass route 12. The network input I/F 7 has an emergency suspension function to temporarily suspend the processing of inputting and outputting general communication data excluding emergency data when an emergency suspension command is sent from the route control unit 15.

The network buffer 9 has a function to temporarily store and retain communication data received through the network input I/F 7.

The network output I/F 11 receives communication data from the network input I/F 7 thorough the bypass route 12 or from the network buffer 9 and transmits the received communication data to the device output I/F 19 or to the route hub RH4 located on a downstream side over the data transmission line 3c.

The device input I/F 13 has three input ports P1, P2 and P3, receives communication data from the functional devices N8 and N9 connected thereto through the first to third input ports P1, P2 and P3, carries out the processing of converting the received communication data and transmits the converted communication data to the network input I/F 7 and the route control unit 15.

The emergency occurrence detection unit 17 is provided in the route control unit 15 and has an emergency occurrence detection function that it always monitors and receives operation information on the functional devices N7, N8 and N9 from the operation control unit 21 or communication data from the route hub RH2 located on an upstream side through the network input I/F 7, detects whether or nor an emergency occurs in the functional device N8 or N9 as an input system connected to the route hub RH3, or in a route hub RH or a functional device N other than the route hub RH3 and the functional devices thereof with reference to the received operation information or communication data, and informs the route control unit 15 when it detects the occurrence of an emergency and when it does not detect the occurrence of an emergency any longer. The emergency occurrence detection unit 17 may be provided as a unit separate from the route control unit 15.

A description is subsequently given of how to detect the occurrence of an emergency by the emergency occurrence detection unit 17. The emergency occurrence detection unit 17 detects the occurrence of an emergency when it receives an emergency command indicating the occurrence of an emergency from the functional device N8 or N9 as an input system through the operation control unit 21 or an emergency command from a route hub RH or a functional device N other than the route hub RH3 and the functional devices thereof through the network input I/F 7 at the time of the occurrence of an emergency in the functional device. The unit 17 detects the end of the emergency when it receives an emergency cancellation command indicating the end of the emergency from the functional device N8 or N9 as an input system through the operation control unit 21 or an emergency cancellation command from a route hub RH or a functional device N other than the route hub RH3 and the functional devices thereof through the network input I/F 7 at the time of the end of the emergency in the functional device N.

The route control unit 15 has a route selection function, emergency suspension instruction function, emergency cancellation instruction function and emergency data transmission function.

According to the route selection function, the route control unit 15 receives communication data from the route hub RH2 located on an upstream side through the network input I/F 7 or from the functional device N8 or N9 through the device input I/F 13, judges whether or not the address of a destination written in the destination address portion 27 of the received communication data agrees with any address of the address (RH3) of the route hub RH3 and the address (N7) of the functional device N7 connected to the route hub RH3, transmits a route selection signal for selecting a route for guiding the communication data to the address of the destination to the network input I/F 7 when it is judged that the address of the destination written in the destination address portion 27 agrees with any address of the address (RH3) of the route hub RH3 and the address (N7) of the functional device N7 or a route selection signal for selecting the bypass route 12 for transmitting communication data to the network output I/F 11 not through the network buffer 9 when it is judged that the address of the destination written in the destination address portion 27 does not agree with any address of those addresses.

According to the emergency suspension instruction function, the route control unit 15 transmits an emergency suspension command for temporarily suspending the processing of inputting and outputting general communication data excluding emergency data to the network input I/F 7 and the device output I/F 19 when it is informed of the occurrence of an emergency by the emergency occurrence detection unit 17.

According to the emergency cancellation instruction function, the route control unit 15, transmits an emergency cancellation command for canceling an emergency suspension command to the network input I/F 7 and the device output I/F 19 when it is informed of the end of an emergency by the emergency occurrence detection unit 17.

According to the emergency data transmission function, the route control unit 15 secures a route for communicating emergency information such as source data transmitted from the receiving functional device N8 or N9 and transmits emergency data including emergency information and an emergency command to at least one predetermined destination through the network output I/F 11 when it is informed the occurrence of an emergency in the functional device N connected to the route hub RH3 by the emergency occurrence detection unit 17.

The device output I/F 19 has three output ports P4, P5 and P6 to receive communication data from the network output I/F 11, carries out the processing of converting the received communication data and outputs the converted communication data for example to the functional device N7 through the first output P4 selected from the first to third output ports P4, P5 and P6. The device output I/F 19 has an emergency suspension function to temporarily suspend the processing of inputting and outputting general communication data excluding emergency data when it receives an emergency suspension command from the route control unit 15.

Figure 4:
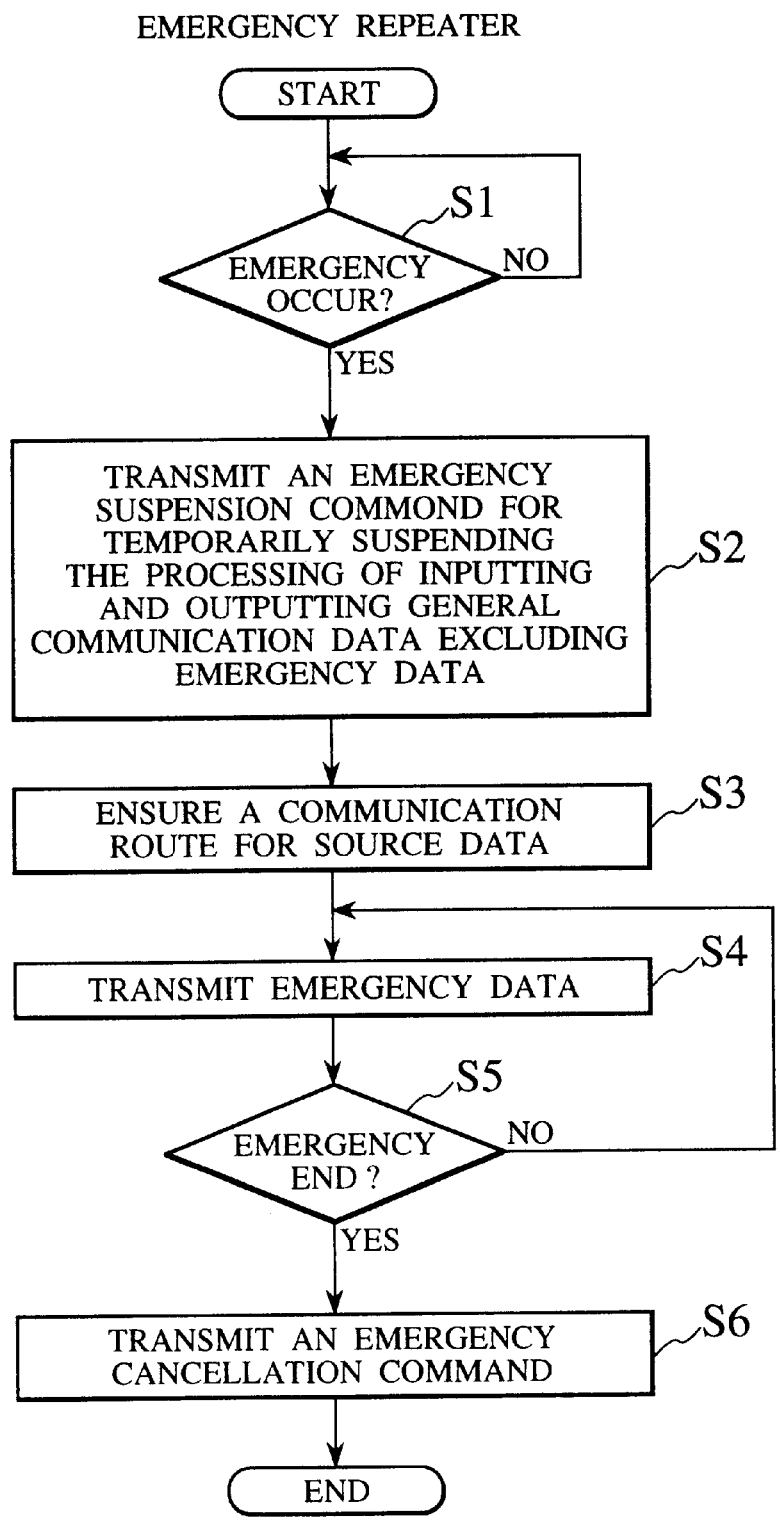
FIG. 4 is a flow chart showing the processing procedure of an emergency repeater.
Figure 5:
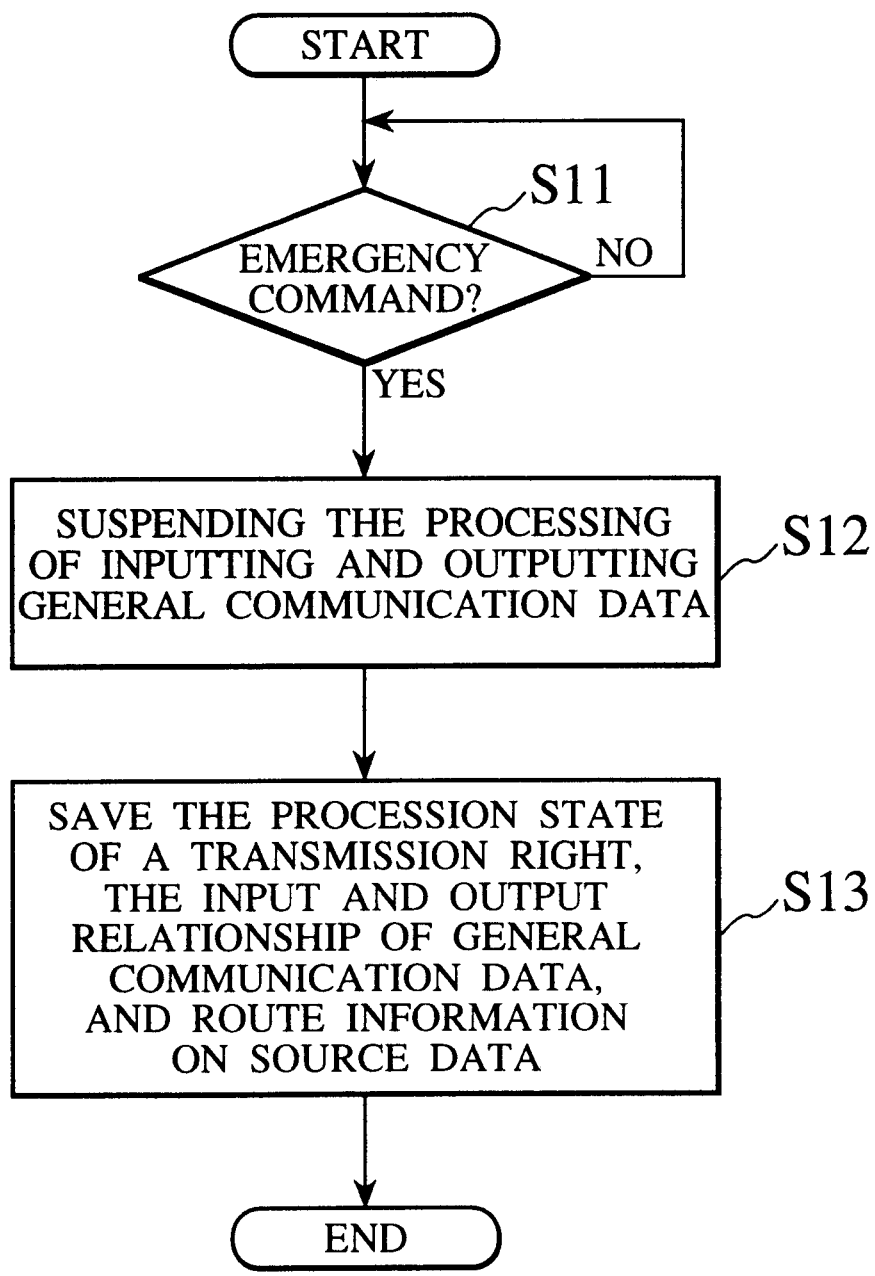
FIG. 5 is a flow chart showing a processing procedure when a repeater other than an emergency repeater receives an emergency command.

The processing flow of each route hub RH will be explained subsequently, for example the route hub RH3 when an emergency occurs in the functional device N8 or N9 as an input system connected to the route hub RH3 and when an emergency occurs in a route hub RH or a functional device N other than the route hub RH3 and the functional devices thereof with reference to the operation flow charts of FIGS. 4 to 6.

For simplicity's sake, a functional device in which an emergency occurs is called "emergency functional device", a repeater connecting the emergency functional device is called "emergency repeater", the address of the emergency functional device and the emergency repeater is called "emergency address" and communication data including a command informing the occurrence or end of an emergency is called "emergency data".

The processing flow of the route hub RH3 when an emergency occurs in the functional device N8 or N9 as an input system connected to the route hub RH3 is first described. As shown in FIG. 4, the emergency occurrence detection unit 17 always monitors and receives operation information on the functional devices N7, N8 and N9 from the operation control unit 21 and judges whether an emergency occurs in the functional device N8 or N9 as an input system connected to the route hub RH3 with reference to the received operation information (step S1). When the emergency occurrence detection unit 17 judges that an emergency occurs in the functional device N8 or N9 as an input system connected to the route hub RH3, then informs it to the route control unit 15.

Based on this information, the route control unit 15 transmits to both the network input I/F 7 and the device output I/F 19 an emergency suspension command (emergency command) for temporarily suspending the processing of inputting and outputting general communication data excluding emergency data which includes a transmission frame whose address of a destination or a source agrees with the emergency address (step S2). Based on this emergency suspension command (emergency command) transmitted from the route control unit 15, the network input I/F 7 and the device output I/F 19 temporarily suspend the processing of inputting and outputting general communication data excluding emergency data independently. At this point, the network input I/F 7 and the device output I/F 19 carry out the processing of inputting and outputting only emergency data independently.

The route control unit 15 ensures a communication route for communicating emergency information such as source data from the emergency functional device (step S3), and instructs to transmit emergency data including emergency information, emergency command and emergency address as a source to at least one predetermined destination device through the network output I/F 11. Based on this instruction, the network output I/F 11 transmits the emergency data to at least one predetermined destination (step S4). The destination device of the emergency data in step S4 is at least one arbitrarily selected from the functional device N7 as an output system, and route hubs RH and functional devices N other than the route hub RH3 and functional devices thereof.

During the transmission of emergency data in step S4, the emergency occurrence detection unit 17 always monitors and receives operation information concerning the functional devices N7, N8 and N9 from the operation control unit 21, judges whether or not the emergency has ended in the functional device N8 or N9 as an input system connected to the route hub RH3 with reference to the received operation information (step S5), and when it is judged that the emergency has not ended yet, the unit 17 continues the processing of transmitting emergency data of step S4, while when it is judged that the emergency has ended, the unit 17 informs an ending of the emergency to the route control unit 15.

Based on this, the route control unit 15 transmits an emergency cancellation command for canceling an emergency suspension command to both the network input I/F 7 and the device output I/F 19 (step S6). Based on this emergency cancellation command transmitted from the route control unit 15, the network input I/F 17 and the device output I/F 19 resume the processing of inputting and outputting general communication data.

The processing flow of the route hub RH3 when an emergency occurs in a route hub RH of a functional device N other than the route hub RH3 and the functional devices thereof will be described when an emergency command is received and when an emergency cancellation command is received with respect to FIG. 5 and FIG. 6.

The case where an emergency command is received is first described. As shown in FIG. 5, the emergency occurrence detection unit 17 always monitors and receives communication data from the route hub RH2 located on an upstream side through the network input I/F 7, and judges whether or not the received communication data includes an emergency command, that is, whether or not an emergency occurs in a route hub RH or a functional device N other than the route hub RH3 and the functional devices thereof (step S11). When it is judged that an emergency occurs in a device other than the route hub RH3 and the functional devices thereof, the emergency occurrence detection unit 17 informs an occurrence of emergency to the route control unit 15.

Based on this, the route control unit 15 transmits an emergency suspension command (emergency command) for temporarily suspending the processing of inputting and outputting general communication data excluding emergency data to both the network input I/F 7 and the device output I/F 19 (step S12). Based on the emergency suspension command (emergency command) transmitted from the route control unit 15, the network I/F 7 and the device output I/F 19 temporarily suspend the processing of inputting and outputting general communication data excluding emergency data independently. At this point, the network I/F 7 and the device output I/F 9 carry out the processing of inputting and outputting only emergency data independently.

The route control unit 15 saves the possession state of a transmission right, the input and output relationship of general communication data with respect to own repeater, i.e. the route hub RH3, and route information on source data at the time when it receives the emergency suspension command (emergency command) into an unshown memory (step S13) to terminate the processing for emergency suspension.

Meanwhile, the processing of receiving an emergency cancellation command is as shown in FIG. 6. The emergency occurrence detection unit 17 always monitors and receives communication data from the route hub RH2 located on an upstream side through the network input I/F 7, judges whether or not the received communication data includes an emergency cancellation command, that is, whether or not an emergency has ended in a route hub RH or a functional device N other than the route hub RH3 and the functional devices thereof (step S21). When it is judged that the emergency has ended in a device other than the route hub RH3 and the functional device thereof, the emergency occurrence detection unit 17 informs the ending of the emergency to the route control unit 15.

Based on this, the route control unit 15 reads out the possession state of a transmission right, the input/output relationship of communication data with respect to the route hub RH3 and route information on source data temporarily saved from the memory to recover the state at the time when the emergency suspension command (emergency command) was received (step S22).

Further, the route control unit 15 transmits an emergency cancellation command for canceling an emergency suspension command to both the network input I/F 7 and the device output I/F 19. The network input I/F 7 and the device output I/F 19 which have received the emergency cancellation command resume the processing of inputting and outputting general communication data (step S23) independently and terminate the processing for emergency cancellation.

The communication method of the present invention will be described in more practically as follows. When emergency data received by a certain repeater includes source data specifying a node terminal connected to the repeater as a destination, the source data is urgent voice information having high priority and a destination node terminal is an audio amplifier incorporating a digital signal processor (DSP) and connecting a speaker, the repeater which has received the emergency data including this voice information forcedly sets a redetermined subchannel out of a plurality of subchannels to an open state regardless of the used/open states of the plurality of subchannels assigned to the destination node terminal so that the voice information having high priority can be output through this open subchannel.

When emergency data received by a certain repeater includes source data specifying a node terminal connected to the repeater as a destination, the source data is urgent image information having high priority, and the destination node terminal is a monitor device capable of displaying digital image information on the screen, the repeater which has received urgent data including image information having high priority forcedly sets an onscreen subchannel out of a plurality of subchannels to an open state regardless of the used/open states of the plurality of subchannels assigned to the destination node terminal so that image information having high priority can be output through the open on-screen subchannel like the above case of voice information.

According to the communication method of the present invention, when each of the plurality of repeaters receives emergency data including at least an emergency command informing the occurrence of an emergency from a node terminal connected to the repeater, a repeater other than the repeater or a node terminal connected to a repeater other than the repeater, it temporarily suspends the processing of inputting and outputting communication data which is not emergency data for itself, preferentially permits the processing of inputting and outputting emergency data for itself, and transmits the received emergency data to at least one destination. Therefore, when a node terminal connected to a certain repeater yields a request to transmit emergency data including an emergency command quickly to at least one node terminal connected to another repeater, the request for transmitting emergency data can be accomplished immediately without executing a redundant processing procedure and without producing an necessary wait time.

Further, according to the communication method of the present invention, after the reception of emergency data including an emergency command, when each of the plurality of repeaters receives emergency data including at least an emergency cancellation command informing the end of an emergency from a node terminal connected to the repeater, or a repeater other than the repeater or a node terminal connected to a repeater other than the repeater, it resumes the processing of inputting and outputting communication data, whereby the communication system can be returned to a normal operation state immediately.

It is to be understood that the present invention is not limited to the above embodiments and various modifications can be made in the present invention without departing from the spirit and scope thereof.

In this embodiment, for example, a repeater which has received emergency data temporarily suspends the processing of inputting and outputting communication data which is not emergency data for itself regardless of the emergency degree of the data and preferentially permits the processing of inputting and outputting emergency data for itself. The present invention can be modified such that an emergency degree description area for describing the degree of emergency is additionally set in the frame format of emergency data, and a repeater classifies the emergency degree on received communication data. When the emergency degree of the received communication is high, a repeater temporarily suspends the processing of inputting and outputting communication data which is not emergency data and preferentially permits the processing of inputting and outputting emergency data, whereas, when the emergency degree of the received communication data is low, it preferentially permits the processing of inputting and outputting emergency data for itself, but also permits the processing of inputting and outputting communication data which is not emergency data for itself as much as possible.

Finally, according to the communication system of the present invention, it is needless to say that data can be exchanged between node terminals connected to an one repeater by interconnecting each another of those channels on an each terminals.

What is claimed is:

1. A communication method, used in a communication system having a plurality of repeaters interconnected by a data transmission line, each of the repeaters being connected to at least one node terminal, the communication system being configured to exchange data between each of the node terminals, between each of the repeaters, and between a given node terminal and a given repeater, the communication method comprising, at each particular one of the plurality of repeaters, the steps of:

receiving emergency data at the particular one of the plurality of repeaters from each node terminal connected to the particular one of the plurality of repeaters, from another one of the plurality of repeaters, or from another node terminal connected to another one of the plurality of repeaters, the emergency data including an emergency command indicating an emergency;

temporarily suspending inputting and outputting of all communication data which is not emergency data at the particular one of the plurality of repeaters;

preferentially permitting the inputting and outputting emergency data at the particular one of the plurality of repeaters; and transmitting the emergency data received by the particular one of the plurality of repeaters to at least one other repeater connected to the data transmission line.

2. The communication method of claim 1, wherein the emergency data further include emergency information on the emergency.

3. The communication method of claim 1, wherein, upon receiving further emergency data including an emergency cancellation command indicating an end of the emergency after receiving the emergency data including the emergency command, the particular one of the plurality of repeaters resumes the inputting and outputting of communication data which is not emergency data and transmits the further emergency data including the emergency cancellation command to at least one other repeater connected to the data transmission line.

4. A communication system having a plurality of repeaters interconnected by a data transmission line, with the plurality of repeaters each being connected to at least one node terminal, the communication system being configured to exchange data between the node terminals, between the interconnect plurality of repeaters, or between any node terminal and any repeater, wherein each of the plurality of repeaters comprises:

receiving means for receiving communication data from each node terminal connected to the particular one of the plurality of repeaters, from another interconnected repeater, and from another node terminal connected to another repeater;

emergency data processing means for temporarily suspending inputting and outputting of all communication data which is not emergency data for the particular one of the plurality of repeaters and preferentially permitting the inputting and outputting of emergency data for the particular one of the plurality of repeaters when the receiving means receives emergency data including an emergency command indicating an emergency; and transmitting means for transmitting all data from the particular one of the plurality of repeaters to at least one other repeater connected to the data transmission line.

5. The communication system of claim 4, wherein the emergency data further include emergency information on the emergency.

6. The communication system of claim 4, wherein each of the plurality of repeaters further comprises resuming means for resuming the inputting and outputting of communication data which is not emergency data when emergency data including an emergency cancellation command indicating an end of the emergency is received by the receiving means after the reception of the emergency data including the emergency command, and the transmitting means further transmits the emergency data including the emergency cancellation command to the at least one other repeater.

* * * * *

UNITED STATES PATENT AND TRADEMARK OFFICE
CERTIFICATE OF CORRECTION

PATENT NO. : 6,356,568 B1
DATED : March 12, 2002
INVENTOR(S) : Yoshinori Nakatsugawa It is certified that error appears in the above-identified patent and that said Letters Patent is hereby corrected as shown below:

Column 2,
Line 13, please change "a" to -- an --.

Column 6,
Line 40, please change "nor" to -- not --.

Column 10,
Line 23, please change "redetermined" to -- predetermined --.

Column 11,
Line 34, please delete "an";
Line 36, please delete "an".

Signed and Sealed this

Twenty-third Day of July, 2002

*Attest:*

*Attesting Officer*

JAMES E. ROGAN
*Director of the United States Patent and Trademark Office*